United States Patent Office 3,177,339
Patented Apr. 6, 1965

3,177,339
WELDING
Hansdietrich Scheruhn, Werries uber Hamm, Germany, assignor to Westfälische Union Aktiengesellschaft für Eisen- und Drahtindustrie, Hamm, Westphalia, Germany, a German corporation
No Drawing. Filed Aug. 31, 1962, Ser. No. 220,886
17 Claims. (Cl. 219—137)

This invention relates to welding and provides new welding rods and new procedures for welding. More particularly, the invention relates to welding of sections disposed at an angle to the horizontal, as well as to horizontal welding.

It is known that metal sections, particularly sheet metal sections of relatively thin cross sections, such as 0.5–3 mm., can be welded by the under-rail procedure with laid-on electrode. This procedure is suitable, however, only for welding with the sections disposed horizontally. The electrodes used in under-rail welding commonly have a rutile acid or ore-acid sheath. For welding of austenitic sheet metals, the electrodes commonly have a sheath formed of a mixture of calcite, rutile, and magnesium silicate.

For welding sections disposed at an angle to the horizontal, including vertically disposed sections, and welding overhead, the rod can be inlaid in the seam for welding and a magnetic field can be used for directing the arc. In such welding, i.e., welding sections deviating from the horizontal, the direction of welding is the descending direction. Welding rods having a rutile acid sheath containing up to 25% cellulose can be used. Such welding rods, however, containing as they do a high percentage of cellulose, cannot be depended upon to form consistently sound weld joints.

The principal object of the invention is to provide welding rods and proceudres for welding metal sections, particularly steel sections and steel sections of relatively thin cross section, which are disposed at an angle to the horizontal (including overhead welding), and which can be depended upon to form consistently good welds, including thorough welds in the root of the seam and welds of good consistency throughout.

A further object of the invention is to provide rods in accordance with the aforementioned principal objective, and further having good flexibility so that the rod will withstand bending and can hence be laid in circumferential pipe seams, all without the sheath cracking.

According to the invention, these and other objects are attained by utilizing a line base sheath. These electrodes differ in their welding properties quite substantially from the known electrodes having a lime base sheath and which have been used for normal manual welding. Thus whereas lime base sheaths are known such sheaths include calcite, fluorspor, ferro-maganese and potassium silicate, and while the sheath according to the invention includes these ingredients, it further includes carbohydrate, zirconium silicate, and potassium aluminum silicate. These ingreditents which are not known for lime sheaths to impart the desired properties for rods to be used at an angle to the horizontal.

The welding rod of the invention, particularly a steel welding rod, comprises:

45–20% calcite
20–5% fluorspar
0.5–5% carbohydrates
1–10% potassium aluminum silicate
3–20% zirconium silicate
0.7–10% over refined ferro-manganese, and
0.5–7% aluminum
Up to 30% steel powder
Up to 10% rutile The potassium almuinum silicate is preferably in the form of muscovite-mica, and before being included in the admixture, it should be subjected for about an hour to a heat treatment at 500–800° C., in order to expel the water of crystallization.

Potassium silicates serve as binding agents.

The almuinum in amount of 0.5–7.0%, preferably 1.4–7.0%, is provided in order to provide the required increase in viscosity of the slag and of the metal bath.

The over refined ferro-manganese in amount of 0.7–10%, preferably 2–10%, is 0.05–0.15% carbon and 85–95% manganese.

The ferro-manganese and aluminum should bear a quite specific ratio, namely ferro-manganese to aluminum, 1.4:1.

The sheath can include steel powder, and the steel powder preferably has an oxygen content of less than 0.3% and carbon content of 0.05–0.15%. The amount of steel powder can be 0–30%, preferably 5–30%. Commonly a steel powder content in the range of 15–30% will be desirable.

Further, the sheathing can contain rutile. The rutile can be 0–10%, and is commonly desirably 5–10%. The core of the rods, particularly steel wire, can be 0.04–0.2% carbon, up to 0.35% silicon, 0.3–1.4% manganese, not more than 0.025% phosphorus, and not more than 0.025% sulfur.

For joining of high temperature sections, such as high temperature pipe sections of steel containing 0.1–1.0% molybdenum, and 0.3–3.0% chromium, the rod core can include up to 3% chromium, for example 0.1–3% chromium and further can include up to 1% molybdenum, for example 0.05–1% molybdenum. Instead of providing for imparting the alloy content to the weld by including the alloying metals in the rod, alloy additions may be made to the sheathing. This can be in the form of inclusions in the sheathing of materials which will give off the corresponding molybdenum and chromium quantity to the weld upon effecting of the weld joint.

Further, for the welding of sections of austenitic high temperature steels or acid-resistant steels, appropriate additions of various metals may be made to the rod to impart to the weld the desired metals so as to conform the weld to the sections joined. Where highly alloyed core wires are used, it is desirable that provision for loss by burning of easily oxidized elements, such as chromium, niobium and tantalum, be made by addition of such metals as powders to the sheathing. One or more or all of the metals as are easily oxidized can be included in the sheathing. Steel core composition, particularly useful for the welding of austenitic high temperature steels and acid-resistant steels comprise:

0.02–0.15% carbon
17–28% chromium
7–20% nickel
0.2–3% molybdenum, and
0.5–2% of niobium or tantalum Niobium and tantalum can each be included in the amount mentioned, if desired.

In the practice of the invention, using unalloyed or an alloy core rod, it was found that satisfactory welds could be made employing the inlaid technique with a magnetic field, and welding seams disposed at an angle to the horizontal in a descending direction. The welds display good burning-in at the seam root, and possess a high ductility (viscosity, toughness, and tenacity), and have an impact resistance in mkg. per cm.$^2$, of as much as 22.

During the welding, the slag does not suffocate the arc, and in consequence of the magnetic field, the slag is forced to the surface both above and below the metal, and the slage adheres there.

The rods of the invention are particularly useful for the welding of tubing such as pipes of circular cross section, and also are well suited for use in the welding of receptacles such as tanks. The pipes can be of diameter 200 mm.–2.000 mm. and have wall thicknesses of 5–25 mm. The pipe steel can be St 35.8 or a cold expanded steel with more than 52 kg. per mm.² strength. The rod of the invention, particularly the rod having a core such as the 0.04–0.2% carbon core described above, is formulated so that it is well suited for imparting the desired strength and ductility to all types of steels ranging from St 34 to St 52 cold expanded, and even more.

The rods of the invention are suitable at the plus pole of a direct current hook up, or are suitable for use of alternating current. Alternating currents of frequency more than 50 Hertz and up to 250 Hertz are particularly advantageous. The exciting field for the magnets can be of the same frequency. The preferred frequency is 100 Hertz.

*Example*

A steel rod of the following composition is coated with a sheath of the composition set forth. This rod is well suited for welding 5–25 mm. sheets ranging from St 34 to St 52 cold expanded.

Rod:
    0.1% carbon
    0.1% silicon
    0.3% manganese
    0.025% phosphorus
    0.025% sulfur Sheath:
    40% calcite
    17% fluorspar
    4% carbohydrate
    8% potassium aluminum silicate
    17% zirconium silicate
    8% over-refined ferro-manganese
    6% aluminum The sheath can be applied in the well-known conventional manner for applying sheaths to welding rods and and electrodes.

All percentages set forth herein are weight percent unless otherwise indicated.

It may be mentioned that the carbohydrates to be added to the sheath may be selected from the groups comprising cellulose, dextrin, starch, flour, molasses, or mixtures thereof. The addition of cellulose is preferred.

The sheathing mass is applied to the core wire by pressing, extruding, or the like. According to these methods of coating, the amount of binder to be used (potassium silicate) is chosen as to bring the mass to the desired constancy. In general, the amount of binder is between about 2–8% relative to the dry sheath mass.

What is claimed is:

1. A welding rod comprising a steel core and having a sheath comprising:
45–20% calcite
20–5% fluorspar
0.5–5% carbohydrates
1–10% potassium aluminum silicate
3–20% zirconium silicate
0.7–10% over-refined ferro-manganese and
0.5–7% aluminum
Up to 30% steel powder
Up to 10% rutile 2. A welding rod according to claim 1, said rod having a steel core comprising:
0.04–0.2% carbon
Up to 0.35% silicon
0.3–1.4% manganese
Not more than 0.025% phosphorus, and
Not more than 0.025% sulfur 3. A welding rod according to claim 1, said rod having a steel core comprising molybdenum and chromium in amounts of, respectively, up to 1% and up to 3%.

4. A welding rod according to claim 1, said rod having a steel core comprising:
0.02–0.15% carbon
17–28% chromium
7–20% nickel
0.2–3% molybdenum, and
0.5 to 2% of a metal selected from the group consisting of niobium and tantalum.

5. A welding rod according to claim 1, said sheath containing at least one alloying element selected from the group consisting of chromium, niobium, and tantalum.

6. In the arc welding of sections at angles varying from horizontal wherein a welding rod is laid in the weld seam and a magnetic field is used to direct the arc, the improvement which comprises, utilizing as the welding rod, a rod according to claim 1, and welding in a descending direction.

7. Welding according to claim 6, wherein an alternating current of 50–250 Hertz is employed.

8. In the arc welding of sections at angles varying from horizontal wherein a welding rod is laid in the weld seam and a magnetic field is used to direct the arc, the improvement which comprises, utilizing as the welding rod, a rod according to claim 2, and welding in a descending direction.

9. In the arc welding of sections at angles varying from horizontal wherein a welding rod is laid in the weld seam and a magnetic field is used to direct the arc, the improvement which comprises, utilizing as the welding rod, a rod according to claim 3, and welding in a descending direction.

10. In the arc welding of sections at angles varying from horizontal wherein a welding rod is laid in the weld seam and a magnetic field is used to direct the arc, the improvement which comprises, utilizing as the welding rod, a rod according to claim 4 and welding in a descending direction.

11. In the arc welding of sections at angles varying from horizontal wherein a welding rod is laid in the weld seam and a magnetic field is used to direct the arc, the improvement which comprises, utilizing as the welding rod, a rod according to claim 5 and welding in a decending direction.

12. Welding rod according to claim 1, wherein the ratio of ferro-manganese to aluminum is about 1.4:1.

13. Welding rod according to claim 2, wherein the ratio of ferro-manganese to aluminum is about 1.4:1.

14. In the arc welding of sections at angles varying from horizontal wherein a welding rod is laid in the weld seam and a magnetic field is used to direct the arc, the improvement which comprises, utilizing as the welding rod, a rod according to claim 12, and welding in a descending direction.

15. In the arc of sections at angles varying from horizontal wherein a welding rod is laid in the weld seam and a magnetic field is used to direct the arc, the imporvement which comprises, utilizing as the welding rod, a rod according to claim 13, and welding in a descending direction.

16. Welding rod according to claim 1, wherein the said ferro-manganese is about 2–10%, and the said aluminum is about 1.4–7%.

17. Welding rod according to claim 2, wherein the said ferro-manganese is about 2–10%, and the said aluminum is about 1.4–7%.

References Cited by the Examiner

UNITED STATES PATENTS 2,773,969   12/56   Gunther _____ 219—130

FOREIGN PATENTS 819,958   9/59   Great Britain.
842,204   7/60   Great Britain.

RICHARD M. WOOD, *Primary Examiner.*
JOSEPH V. TRUHE, *Examiner.*